UNITED STATES PATENT OFFICE.

FREDERICK GEORGE ANNISON, OF LONDON, ENGLAND, ASSIGNOR TO THE PUBLISHING, ADVERTISING AND TRADING SYNDICATE, LIMITED, OF SAME PLACE.

ART OF COATING FABRICS OR PERMEABLE MATERIALS WITH NITROCELLULOSE COMPOUNDS AND PRODUCT PRODUCED THEREBY.

SPECIFICATION forming part of Letters Patent No. 602,797, dated April 19, 1898.

Application filed September 10, 1897. Serial No. 651,248. (No specimens.)

*To all whom it may concern:*

Be it known that I, FREDERICK GEORGE ANNISON, a subject of the Queen of Great Britain, and a resident of London, England, have invented certain new and useful Improvements in the Art of Coating Fabrics or Permeable Materials with Nitrocellulose Compounds and in the Products Produced Thereby, of which the following is a specification.

My invention comprises a new process or method of operation and a new product produced thereby. This new product consists of a cloth, felt, leather, or similar flexible permeable base having united to it in a novel manner a waterproof surface of a durable, flexible, tough, and elastic character composed of nitrocellulose compound intimately combined with or united to the base; and my new process consists of the novel method of obtaining my product hereinafter described. Such product may be applied to a variety of uses in the arts where permanent waterproof surfaces of the character suggested are desired.

The invention is specially advantageous in the production of ornamental surfaces either in plain or embossed effects, which I have produced in a variety of designs and colors and applied to various uses in the arts—for instance, as wall decorations, for upholstering, floor-covers, and as imitation grain and other leathers, &c.

In practicing my invention I use fluid solution of nitrocellulose dissolved in camphor, or its equivalent, and spirit—such as grain-alcohol, wood-alcohol, or methylated spirit, or their equivalents. This solution may be designated as, and in fact is, a "fluid" solution of celluloid, xylonite, ivorine, or such like compounds, which are well known in the prior art. They are quite different from collodion, and their characteristic difference is due to the use of camphor as one of the solvents, although of course any equivalent of camphor that will give to the solution the same or substantially the same characteristics or properties may be employed. By the application of such solutions to a permeable base and their treatment after such application, as hereinafter described, I obtain coatings or surfaces intimately united with or welded to the base and of a character that, so far as I know, has never before been produced.

In my present invention I first impregnate the permeable base with a solution of the compound sufficiently fluid to penetrate to such a depth beneath the surface as to obtain a firm anchorage within the substance of the base and then apply successive coatings of the compound having a less degree of fluidity, as hereinafter described, until a surface having the requisite body has been attained or built up.

In applying the impregnating and successive coats of the compound I prefer, where possible, to operate upon the base while in the form of a web of considerable length and to effect the application of the compound to the surface of the base in a way well known in analogous arts, viz: to cause the web in its traverse to assume a dip or trough-like position transversely at a given point immediately adjacent to a knife, straight-edge, or "doctor" under and in contact with which the web passes, the solution being applied to the base in the hollow or trough formed by its dip. The degree of fluidity of the impregnating application depends upon the closeness of mesh or hardness of twist of the strands or threads or upon the density of the basic material, and as the characteristics of materials in these respects vary I cannot ascribe to the solution any fixed degree of fluidity that would be best in all cases. The closer the mesh and the harder the twist of the threads, or the less the permeability of the base, the more fluid should be the impregnating solution. This solution should be of such fluidity that it will be absorbed by or penetrate into the substance of the base in the manner described to a sufficient depth to acquire a firm hold upon it. For instance, in thus impregnating what is ordinarily known as "fustian," cotton flannel, (canton-flannel,) and heavy sheeting I have found that a solution of a fluidity substantially that of common olive-oil at a temperature of from 60° to 80° Fahrenheit is suitable. Where canton-flannel is used as the flexible permeable base, either the fluffy or smooth side may be treated. In practice I have generally applied the compound to the smooth side. When such a solution is applied in the manner described, there is a marked and well-defined, though partial, impregnation of the base, the depth of which impregnation depends, primarily, upon the fluidity of the solution and the speed at which the base travels. As the base thus impregnated leaves the doctor it is passed through a heating-chamber or over a heated table, where it is subjected to such a temperature as to cause the rapid drying of the compound. I preferably heat by steam, which may be at a pressure of from thirty to forty pounds, more or less. The temperature, however, should not be so high as to blister. Since the solvents of the compound are quite volatile, they are evaporated very quickly and the residue of the compound remaining in the base becomes quite dry. This rapid drying is desirable, because the more volatile constituents of the solution being quickly sufficiently eliminated the other constituents of the compound remain in substantially the same relation to the fibers or mass of the base that the solution had assumed when it left the doctor—that is to say, a sufficient degree or depth of impregnation having been accomplished, the quick drying would tend to prevent the solution from sinking deeper into the body of the base than is desirable, particularly in the case of the thicker materials. The impregnating solution is thus so deposited in the body of the base as to obtain a firm hold thereon.

If for any special reason a greater depth of penetration is desired, a second application of the relatively fluid solution may be made, although in my own practice I have found one application of the solution sufficient, or the base may be caused to remain in contact with the compound a sufficient time to allow the latter to penetrate the base to the desired depth. The impregnating coating acts as a filling and forms more or less attenuated impermeable films on or around the fibers and strands of the basic material, and also to an extent fills or closes the interstices. I therefore do not require for the subsequent coatings a solution as thin as the solution for the first coat, because the design is that the latter shall penetrate the base to the desired depth and fill and close, as far as it can, the interstices between the parts composing the base and shall more or less penetrate and envelop the parts thereof and adhere to them, thereby securely attaching itself to the base. For the subsequent coatings I have employed solutions of a viscosity similar to that of thick molasses. The relative thickness of the impregnating and succeeding coatings is of course due to the relative quantities of solvent and dry nitrocellulose contained in the compounds or solutions. This heavy solution, being applied in the manner previously described or in a suitable manner, is readily and evenly distributed upon the impermeable film or films formed by the impregnating coating, further filling the impregnated part of the base and partially or entirely closing the interstices thereof. The second coating, as applied, passes immediately to the drying apparatus, where it is quickly dried upon or in proper relation to the impregnating coating. I may apply from one to six coats of this heavy solution, rapidly drying each coating as described. In each instance, however, the solution should have sufficient fluidity to be spread smoothly and uniformly in a thin film or films upon the previously-dried coat and act as a solvent thereon, so as to effect a perfect weld or junction with the dried coating upon which it is superposed. I may after a coating has been applied and dried calender the surface by suitably-heated rolls, which may have a temperature as high as 250° Fahrenheit, produced by steam, with which the polished roll is preferably heated. I prefer, however, to postpone the calendering operation until the final coating is applied and dried, and I have generally produced the best results when operating in that way. Where imitation patent leathers are being made, however, it is desirable to calender after the first and earlier coatings have been dried or after each coating is dried in order to crush down or obliterate the "pearl" of the base. If embossed effects are to be produced, the dried coated base, preferably first calendered, is passed through embossing-rolls having about the same temperature as the calendering-rolls, the male roll being heated, preferably, by steam.

By the method of procedure hereinbefore described I am enabled to secure the desired depth of impregnation and build up rapidly upon the impregnated coating by the application of a solution relatively heavy or viscous as compared to the impregnating solution until a surface having the desired body and character has been obtained. When the desired number of coats has been applied, the compound presents a superficial sheet or film extending down into the base and firmly united thereto—that is to say, the fibers of the base are incased, molded, or contained within the inner part of the coating. The flexibility of a permeable base thus impregnated and coated is but slightly impaired, because the surface coating may be, and in practice is, quite thin, while the lower or inner part of the compound forming the coating contains a multitude of very flexible fibers, which are surrounded by the compound, back of which there is the flexible unfilled or unimpregnated portion of the base.

As is well known to those skilled in the manufacture of celluloid and analogous derivatives of nitrocellulose, the various solutions which I employ may be colored by the addition of suitable coloring-matter. Where dry pigments are used, I preferably grind them in castor-oil or its equivalent and add to the compound. I prefer to use castor-oil because its adaptability for use in celluloid compounds is well known, and it is largely so used because of its stability and non-liability to oxidize. The impregnating coating preferably contains no coloring-matter, particularly if dry pigments be used, first, because it is unnecessary, and, second, because this is the anchoring coating and it is best not to imperil its tenacity or diminish its penetration into the substance of the base by the admixture of coloring-matter of doubtful composition and uncertain effect. All other coatings may contain coloring-matter, and the number of coats applied depends to an extent upon the shade of color to be produced, as well as upon the desired thickness or body of the coating. The final coating by preference contains no coloring-matter and is transparent. It is best to use as a base a material of proper color to assist in the production of the desired shade at the surface. I am thus enabled to produce beautiful effects in plain and embossed surfaces in a large variety of colors. It will be apparent that by coating permeable materials in the manner described I can build up the coating to such thickness or body as may be desired.

In order to impart a greater degree of permanent flexibility to the product, I usually make all or most of the solutions employed except the final relatively rich in oil. The initial impregnating solution may or may not contain oil; but I prefer that it should. Subsequent coatings are relatively rich in oil, and the final coat or coats preferably contain less oil or no oil. The presence of the oil insures an increased degree of flexibility, and when applied as described, with a final coat containing little oil or none at all, the oil is imprisoned within the coating. I thus produce a very flexible product which will stand long-continued use and exposure without material change.

The compound of nitrocellulose, camphor, and alcohol is mixed in well-known ways to about the consistency of ordinary putty, and is then thinned to the required degree of fluidity by gradually adding alcohol. For the first or impregnating coating, after the compound has been thinned to about the fluidity of olive-oil I may add about two per cent., more or less, in bulk, of castor-oil or other oil producing a like result, if the impregnating coating is to contain oil, but a smaller quantity of oil, one per cent. or less in bulk, may be employed. Good results are obtained when the solutions for subsequent coatings rich in oil contain from five to eight gills of castor-oil, including that in which the coloring-matter, if any, is ground, per pound of nitrocellulose. Following which I may apply one or more coats of solution containing less oil—say half the quantity—and a final coat or coats of a solution containing no coloring-matter and still less oil or none at all.

The impregnating solution and the succeeding thicker solutions are separately prepared, and the fluidity depends upon the relative quantities of the solvent and dry nitrocellulose.

It is obvious that my invention is susceptible of considerable modification in detail without departing from its spirit, since the permeable base employed and the use for which the finished product is desired will naturally vary within wide limits. Therefore it is impossible to give a hard and fast rule which will be applicable alike to the materials of varying permeability and thickness and to each and every proposed use. Thus after the impregnating coating has been applied two or three or more coats of a composition may be applied, according to the thickness of the solution, the set of the doctor, and the rapidity with which the fabric passes it, and yet the results be practically identical. Again, in the exigencies of modern commercial production upon a large scale, where economy of manufacture is so studied, no competent manufacturer will waste labor and material in coating his base to a degree in excess of what is required to produce a product adapted to the intended use. These matters must, therefore, be necessarily left largely to the good judgment of the manufacturer, but will present no difficulty to a competent man familiar with the contents of this specification.

As already described, in practice I have produced the best results by applying, after the impregnating coating, a number of coats of the heavier solution, each coat being exceedingly thin. Why this is so I cannot positively say, but I have found in practice that a surface that is built up of several very thin coatings will stand hard usage better than one of equal thickness built up by one or two thick applications. It is obvious, however, that by first applying an impregnating coating I obtain the requisite hold upon the base and that the subsequent coat may be formed by a small number of coatings, or for some purposes of even one coat of a heavier compound if of such character that it attacks the impregnating compound and forms a sufficiently good weld with it.

As a specific example I might say that in making imitation grained and embossed leathers, using canton-flannel as a base, in practice I have obtained good results by using an impregnating solution containing two per cent. in bulk of castor-oil, then applying four coats of the heavy solution containing six gills of castor-oil, including that in which the color is ground, per pound of nitrocellulose contained in the compound, then two coats of the heavy solution containing three gills of castor-oil, including that in which the color is ground, per pound of nitrocellulose, and, finally, one or two coats of clear heavy solution containing one and one-half gills of oil, after which the surface is calendered and embossed. Each coating being exceedingly thin the final result is a very thin superficial coat consisting of a number of films merging into each other and securely anchored within the substance of the base.

From the foregoing it is apparent that there are two features of my invention that severally and jointly contribute to the results I have obtained. First, by using an impregnating solution of such fluidity as to cause it to impregnate or impermeate the base to the extent desired I so prepare the base that it is ready to receive a coating of very much heavier solution, which while not impregnating the base to a greater depth may be readily spread upon and united with the impregnating coating and fills any interstices remaining unfilled. Thus I obtain an intimate tenacious union between the fabric or base and the built-up surface, and by using heavy solutions I can readily build up the surface without impregnating the base deeper than is desired. Second, by building up the surface by successive coatings rich in oil and then finishing by one or more coatings containing very much less oil, or none at all, the oil is imprisoned beneath the finishing coat, thereby rendering substantially permanent the greater degree of flexibility due to its use and giving a clean dry finished surface. It is also apparent that the impregnating coating when it contains no oil protects the base from the oil in the succeeding coats and that if the hereinbefore-mentioned final imprisoning coating, deficient in oil, should be omitted such a product would be flexible and would possess some of the desirable features of my invention. Consequently the mere omission of the said final imprisoning coating, deficient in oil, would not be a departure from that feature of my invention which contemplates protecting the base from the oil.

I have heretofore described the compound as applied to but one surface of the permeable base; but it is obvious that both surfaces may be so treated if such a product be desired.

The coating applied or built up upon the base, as herein described, is homogeneous in that it is structurally integral and extends integrally from the surface to and within the substance of the base.

I do not claim as of my invention a waterproof fabric having two or more successive coatings of a flexible nitrocellulose or pyroxylin compound the under coating of which is more flexible than the upper coating or coatings, and each of my claims is clearly distinguished from such a product.

I claim as my invention—

1. The herein-described improvement in the art of applying surfaces of nitrocellulose compound to a flexible permeable base, which improvement consists, first, in impregnating the base with a solution of the compound sufficiently fluid to permeate it to a required depth to secure a firm hold thereon, surround the fibers and to an extent fill the interstices thereof; drying the same; superposing thereupon a solution of the compound thicker than the solution for the first coating but sufficiently fluid to be spread over the surface of the dried impregnating compound, thereby further filling the interstices of the base and partially dissolving the dried impregnating compound so as to coalesce or intimately unite therewith, whereby the coat as a whole is homogeneous and intimately united to, or anchored within, the body of the base.

2. The herein-described improvement in the art of applying surfaces of nitrocellulose compound to a flexible permeable base, which improvement consists, first, in impregnating the base with a solution of the compound sufficiently fluid to permeate it to a required depth to secure a firm hold thereon; surround the fibers and to an extent fill the interstices thereof; second, drying the impregnating compound; third, superposing upon the dried impregnating compound a coating of a solution of the compound thicker than the solution for the first coating but sufficiently fluid to be spread over the surface of the impregnating compound, thereby further filling the interstices of the base and partially dissolving the impregnating compound so as to coalesce or intimately unite therewith; fourth, drying the superposed coating; and fifth, applying one or more coatings of the such heavier solution and drying each in turn until a surface of the requisite body has been built up; whereby the coat as a whole is homogeneous and intimately united to or anchored within the body of the base.

3. The herein-described improvement in the art of applying surfaces of nitrocellulose compound to a flexible permeable base, which improvement consists, first, in impregnating the base with a solution of the compound sufficiently fluid to permeate it to a required depth to secure a firm hold thereon, surround the fibers and to an extent fill the interstices thereof; second, drying the impregnating compound; third, superposing upon the dried impregnating compound a coating or a solution of the compound thicker than the solution for the first coating but sufficiently fluid to be spread over the surface of the impregnating compound, further filling the interstices of the base and partially dissolving the impregnating compound so as to coalesce or intimately unite therewith; fourth, drying the superposed coating; and fifth, applying one or more coatings of such heavier solution and drying each in turn until a surface of the requisite body has been built up, whereby the coat as a whole is homogeneous and intimately united to or anchored within the body of the base; and then compacting the coat by heat and pressure.

4. The herein-described improvement in the art of applying surfaces of nitrocellulose compound to a flexible permeable base, which improvement consists, first, in impregnating the base with a solution of the compound sufficiently fluid to permeate it to a required depth to secure a firm hold thereon, surround the fibers and to an extent fill the interstices thereof; second, drying the impregnating compound; third, superposing upon the dried impregnating compound a coating of a solution of the compound thicker than the solution for the first coating but sufficiently fluid to be spread over the surface of the impregnating compound, further filling the interstices of the base and partially dissolving the impregnating compound so as to coalesce or intimately unite therewith; fourth, drying the superposed coating; and fifth, applying one or more coatings of such heavier solution, and drying each in turn, until a surface of the requisite body has been built up, whereby the coat as a whole is homogeneous and intimately united to or anchored within the body of the base; and then compacting the coat by heat and pressure and finally embossing it.

5. The herein-described improvement in the art of applying flexible surfaces of nitrocellulose compound to a flexible permeable base, which improvement consists in impregnating the base to the desired depth with a liquid solution of the compound; then drying the impregnating compound; then superposing thereupon one or more coatings of a heavier solution of the compound containing oil; then, upon the coating thus produced, applying one or more coatings of the compound containing less oil than is contained in the intermediate coatings, drying each in turn.

6. The herein-described process of coating a base with nitrocellulose compound, consisting in applying to the base a coating of a nitrocellulose compound containing little or no oil, and then applying thereto one or more coatings of nitrocellulose compound rich in oil, and then one or more coatings containing little or no oil, drying each coating in turn, substantially as described.

7. The herein-described improvement in the art of applying flexible surfaces of nitrocellulose compound to a flexible permeable base, which improvement consists in impregnating the base to the desired depth with a liquid solution of the compound containing little or no oil; then drying the impregnating compound; then superposing thereupon one or more coatings of a heavier solution of the compound rich in oil, drying each coat in turn; then, upon the coating thus produced, applying one or more coatings of the compound containing less oil than the immediately preceding coating; drying each coat in turn; and, finally, applying one or more finishing coatings of the compound containing materially less oil or none at all.

8. The herein-described improvement in the art of applying a surface of nitrocellulose compound to a flexible permeable base, which improvement consists in impregnating the surface of the base with a liquid solution of the compound free from pigment; then drying the impregnating coating; then superposing upon the dried impregnating coating a thin coating of a heavier solution of the compound containing coloring-matter and oil that is sufficiently fluid to intimately unite with the dried impregnating coating; then drying the superposed coating; and then successively applying coats of solution containing coloring-matter and oil, drying each in turn, until the coating has been built up to the desired thickness and color; and then superposing upon the last of said coats one or more coats of a solution of the compound free from coloring-matter, and drying the same.

9. The herein-described improvement in the art of applying a surface of nitrocellulose compound to a flexible permeable base, which improvement consists in impregnating the surface of the base with a liquid solution of the compound so as to permeate it to a required depth to secure a firm hold thereon; then drying the impregnating coating; then superposing upon the impregnating coating a thin coating of a solution of the compound containing oil and thicker than the solution for the first coating; then drying such superposed coating, and then successively applying coats of solution containing oil, drying each in turn until the coating has been built up to the desired thickness.

10. The herein-described improvement in the art of applying a surface of nitrocellulose compound to a flexible permeable base, which improvement consists in impregnating the surface of the base with a liquid solution of the compound; then drying the impregnating coating; then superposing upon the dried impregnating coating a thin coating of a heavier solution of the compound containing coloring-matter and oil; then drying such superposed coating; and then successively applying coats of solution containing coloring-matter and oil, drying each in turn, until the coating has been built up to the desired thickness and color.

11. The herein-described article of manufacture, consisting of a flexible permeable base, having a coat of nitrocellulose compound of the character described, consisting of successive intimately-united thin coatings, the first of which is of such fluidity as to impregnate the substance of the base to a required depth and secure a firm hold or anchorage to and within the substance of the base as described, and the succeeding coating or coatings of which are less fluid and are respectively coalesced with or intimately united to the preceding coating.

12. The product or article of manufacture herein described, consisting of a flexible permeable base having a coat of nitrocellulose compound of the character described, which coat has a central stratum relatively rich in oil and a stratum on either side of said central stratum deficient in oil, the outer stratum of which forms a continuous surface covering the face of the base, and the inner stratum of which is of such fluidity as to impregnate the substance of the base to the required depth so as to incase the fibers of the flexible base and anchor the coat firmly to and within the substance of the base, substantially as described.

13. The product or article of manufacture herein described, consisting of a flexible permeable base having a coat of nitrocellulose compound of the character described, which coat has a central stratum relatively rich in oil and a stratum on either side of said central stratum deficient in oil, the outer stratum of which forms a continuous surface covering the face of the base.

14. The article of manufacture herein described, consisting of a flexible permeable base having a coat of nitrocellulose compound of the character described attached thereto, which coat has an inner surface or stratum in contact with the base containing no oil, and a stratum rich in oil lying outside of said inner stratum; whereby the base is protected from the oil.

15. The herein-described article of manufacture, consisting of a flexible permeable base, having a built-up coat of nitrocellulose compound of the character described, consisting of successive intimately-united thin coatings as follows: a first coating which is of such fluidity as to impregnate the substance of the base to such a depth as to secure a firm hold or anchorage to and within the substance of the base as described, then a succeeding coat or coatings which are less fluid and are respectively coalesced with or intimately united to the preceding coating, and finally a finishing coating, oil being so used in the coatings that the resulting coat as a whole has a surface containing little or no oil and is rich in oil beneath its surface.

In testimony whereof I have hereunto subscribed my name.

FREDERICK GEORGE ANNISON.

Witnesses:
FRANK S. OBER,
EDWARD C. DAVIDSON.